US008296825B2

(12) United States Patent
Leone et al.

(10) Patent No.: US 8,296,825 B2
(45) Date of Patent: Oct. 23, 2012

(54) METHOD AND SYSTEM FOR A SECURE CONNECTION IN COMMUNICATION NETWORKS

(75) Inventors: Manuel Leone, Turin (IT); Ettore Elio Caprella, Turin (IT)

(73) Assignee: Telecom Italia S.p.A., Milan (IT)

( * ) Notice: Subject to any disclaimer, the term of this patent is extended or adjusted under 35 U.S.C. 154(b) by 960 days.

(21) Appl. No.: 11/597,832

(22) PCT Filed: May 31, 2004

(86) PCT No.: PCT/IB2004/001774
§ 371 (c)(1),
(2), (4) Date: Nov. 28, 2006

(87) PCT Pub. No.: WO2005/120007
PCT Pub. Date: Dec. 15, 2005

(65) Prior Publication Data
US 2008/0052769 A1    Feb. 28, 2008

(51) Int. Cl.
G06F 7/04 (2006.01)
G06F 15/16 (2006.01)
(52) U.S. Cl. ......... 726/4; 726/5; 726/7; 726/15; 726/18; 726/21; 713/182; 713/153; 709/221; 709/222
(58) Field of Classification Search ............... 726/17–21, 726/2–9; 380/270–272; 709/221, 222; 713/153
See application file for complete search history.

(56) References Cited

U.S. PATENT DOCUMENTS

| | | | | |
|---|---|---|---|---|
| 6,101,380 A * | 8/2000 | Sollee | ............. | 455/411 |
| 6,895,502 B1 * | 5/2005 | Fraser | ............. | 713/168 |
| 7,028,183 B2 * | 4/2006 | Simon et al. | ............. | 713/168 |
| 7,054,613 B2 * | 5/2006 | Smeets | ............. | 455/410 |
| 7,069,433 B1 * | 6/2006 | Henry et al. | ............. | 713/151 |
| 7,152,160 B2 * | 12/2006 | Lantto et al. | ............. | 713/168 |
| 7,177,425 B2 * | 2/2007 | Ben-Chuan et al. | ............. | 380/44 |
| 7,302,487 B2 * | 11/2007 | Ylonen et al. | ............. | 709/229 |
| 7,373,515 B2 * | 5/2008 | Owen et al. | ............. | 713/182 |
| 7,437,158 B2 * | 10/2008 | Russell | ............. | 455/435.2 |

(Continued)

FOREIGN PATENT DOCUMENTS

GB    2 368 237    4/2002

(Continued)

OTHER PUBLICATIONS

Gupta V, Experiments in wireless Internet security, IEEE, vol. 2, pp. 860-864.*

(Continued)

*Primary Examiner* — Nathan Flynn
*Assistant Examiner* — Viral Lakhia
(74) *Attorney, Agent, or Firm* — Finnegan, Henderson, Farabow, Garrett & Dunner, L.L.P.

(57) ABSTRACT

A system for enabling a user to communicate on a virtual private network through a public communication network, the possibility of communicating on the private network depending on the availability to the user of at least one enabling credential sent to the user in encrypted form. The system includes at least one SIM type module available to the user and bearing an encryption mechanism and it is configured to decrypt the enabling credential at the user exploiting the encryption mechanism home by the SIM type module, the SIM type module being able to interact with at least one additional communication network to activate the encryption mechanism.

18 Claims, 3 Drawing Sheets

U.S. PATENT DOCUMENTS

| | | | |
|---|---|---|---|
| 7,574,737 B1* | 8/2009 | Loh | 726/15 |
| 7,702,898 B2* | 4/2010 | Tan | 713/150 |
| 7,707,412 B2* | 4/2010 | Nyberg et al. | 713/168 |
| 7,768,958 B1* | 8/2010 | Baker et al. | 370/328 |
| 7,849,173 B1* | 12/2010 | Uhlik | 709/223 |
| 7,853,783 B2* | 12/2010 | Bin et al. | 713/153 |
| 7,996,888 B2* | 8/2011 | Asunmaa et al. | 726/9 |
| 2002/0059614 A1* | 5/2002 | Lipsanen et al. | 725/75 |
| 2003/0084311 A1* | 5/2003 | Merrien et al. | 713/191 |
| 2003/0139180 A1* | 7/2003 | McIntosh et al. | 455/426 |
| 2003/0167392 A1* | 9/2003 | Fransdonk | 713/156 |
| 2003/0172090 A1* | 9/2003 | Asunmaa et al. | 707/200 |
| 2004/0034794 A1* | 2/2004 | Mayer et al. | 713/200 |
| 2004/0068668 A1* | 4/2004 | Lor et al. | 713/201 |
| 2004/0128509 A1* | 7/2004 | Gehrmann | 713/171 |
| 2004/0196978 A1* | 10/2004 | Godfrey et al. | 380/270 |
| 2004/0229597 A1* | 11/2004 | Patel | 455/411 |
| 2004/0230489 A1* | 11/2004 | Goldthwaite et al. | 705/26 |
| 2004/0250074 A1* | 12/2004 | Kilian-Kehr | 713/172 |
| 2005/0044365 A1* | 2/2005 | Haukka et al. | 713/171 |
| 2005/0101305 A1* | 5/2005 | Natarajan | 455/414.1 |
| 2005/0193103 A1* | 9/2005 | Drabik | 709/221 |
| 2005/0195780 A1* | 9/2005 | Haverinen et al. | 370/338 |
| 2006/0291455 A1* | 12/2006 | Katz et al. | 370/355 |
| 2007/0143612 A1* | 6/2007 | Brown et al. | 713/171 |

FOREIGN PATENT DOCUMENTS

| | | |
|---|---|---|
| WO | WO 00/02406 | 1/2000 |
| WO | WO 00/10352 | 2/2000 |
| WO | WO 01/69838 A2 | 9/2001 |

OTHER PUBLICATIONS

Dierks, T. et al., "The TLS Protocol Version 1.0," Network Working Group Request for Comments: 2246, Category: Standard Track, pp. 1-80, (Jan. 1999).

Fraser, B. et al., "IP Security Protocol (ipsec)," http://www.ietf.org/html.charters/OLD/ipsec-charter.html, pp. 1-5, (Jun. 7, 2004).

Sommerfeld, B. et al., "Secure Shell (secsh)," http://www.ietf.org/html.charters/secsh-charter.html, pp. 1-3, (Sep. 8, 2005).

Freier, A. O. et al., "The SSL Protocol Version 3.0," Transport Layer Security Working Group, http://wp.netscape.com/eng/ssl3/draft302.text, pp. 1-51, (Nov. 18, 1996).

"Specification for the Advanced Encryption Standard (AES)," Federal Information Processing Standards Publication 197, pp. 1-47, (Nov. 26, 2001).

"Announcing the Advanced Encryption Standard (AES)," Federal Information Processing Standards Publication 197, pp. i-iv, (Nov. 26, 2001).

"Announcing the Secure Hash Standard," Federal Information Processing Standards Publication 180-2 (+ Change Notice to Include SHA-224), pp. 1-79, (Aug. 1, 2002).

"Data Encryption Standard (DES)," U.S. Department of Commerce/National Institute of Standards and Technology, Federal Information Processing Standards Publication, FIPS PUB 46-3, pp. 1-3 and 1-22, (Oct. 25, 1999).

Rivest, R. L. et al., "The RC6™ Block Cipher," Algorithm Specification, Version 1.1, pp. 1-21, (Aug. 20, 1998).

Krawczyk, H. et al., "HMAC: Keyed-Hashing for Message Authentication," Network Working Group Request for Comments: 2104, Category Informational, pp. 1-11, (Feb. 1997).

Dobbertin, H. et al., "RIPEMD-160: A Strengthened Version of RIPEMD," RIPEMD-160, Fast Software Encryption, LNCS 1039, pp. 1-13, (1996).

Anderson, R. et al., "Serpent: A Proposal for the Advanced Encryption Standard," AES Submission, pp. 1-23, (1998).

Anderson, R. et al., "Tiger: A Fast New Hash Function," http://www.cs.technion.ac.il/-biham/Reports/Tiger/, pp. 1-9.

Schneier, B. et al., "Twofish: A128-Bit Block Cipher," http://www.counterpane.com/twofish.html, pp. 1-68, (Jun. 15, 1998).

Rivest, R., "The MD5 Message-Digest Algorithm," Network Group, Request for Comments: 1321, MIT Laboratory for Computer Science and RSA Data Security, Inc., pp. 1-21, (Apr. 1992).

Krovetz, T., "UMAC: Message Authentication Code Using Universal Hashing," Network Working Group Request for Comments: 4418, Category: Informational, CSU Sacramento, pp. 1-27, (Mar. 2006).

Frankel, S. et al., "The AES-XCBC-MAC-96 Algorithm and Its Uses With IPsec," Network Working Group, Request for Comments: 3566, Category: Standards Track, pp. 1-11, (Sep. 2003).

* cited by examiner

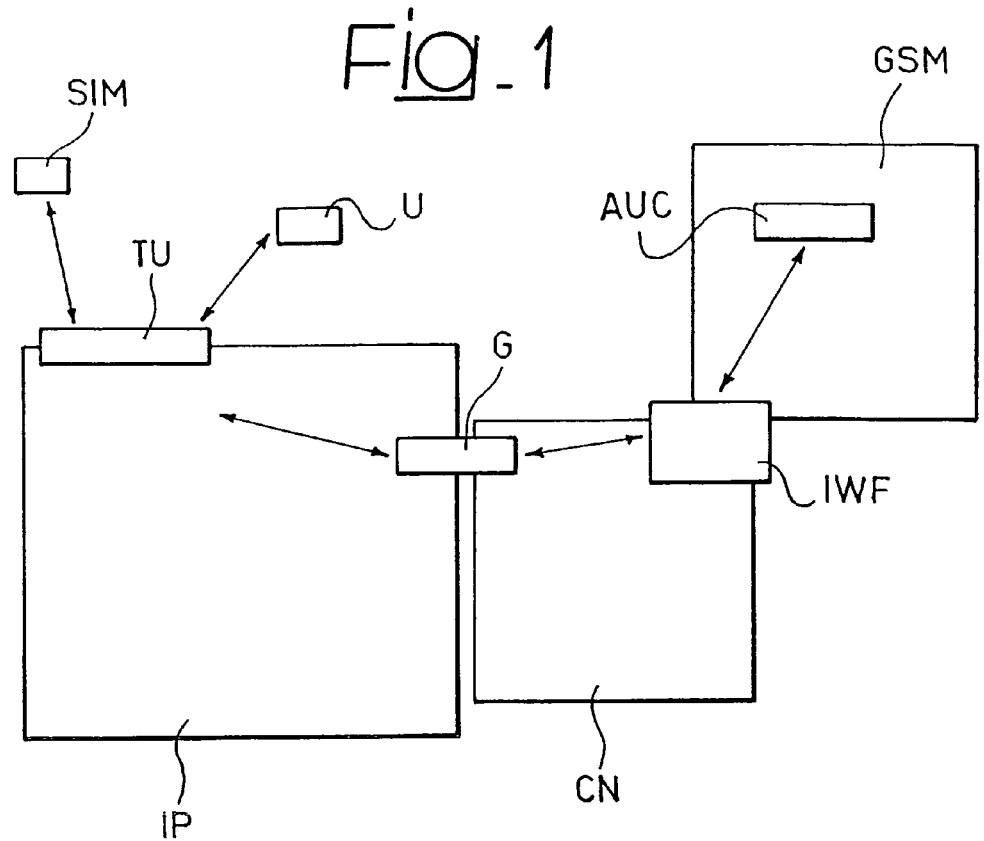
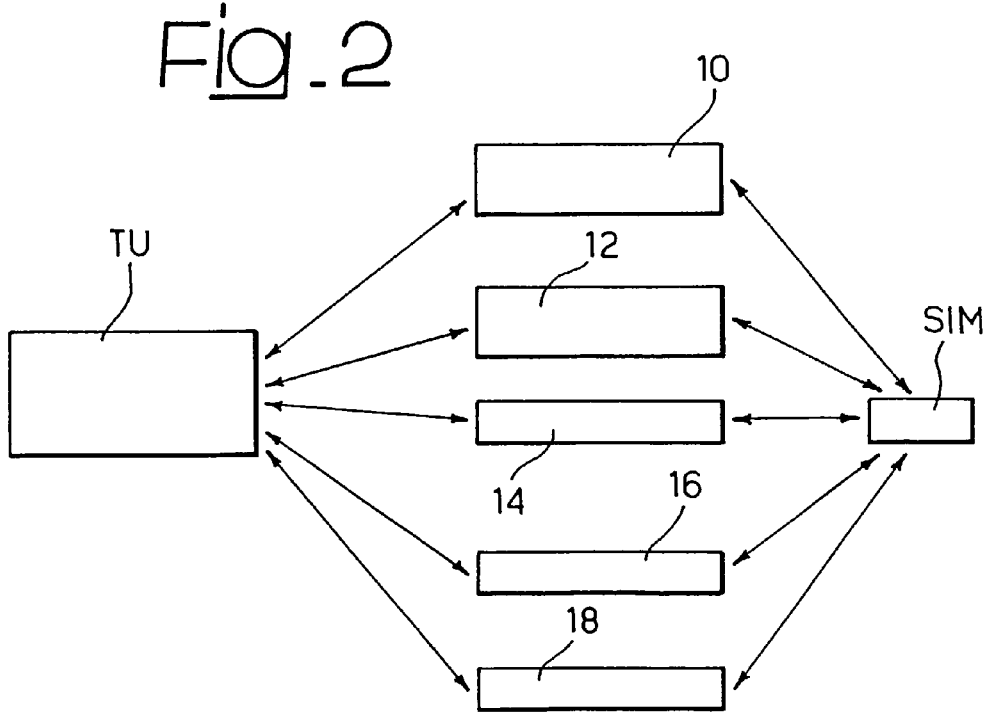

US 8,296,825 B2

METHOD AND SYSTEM FOR A SECURE CONNECTION IN COMMUNICATION NETWORKS

CROSS REFERENCE TO RELATED APPLICATION

This application is a national phase application based on PCT/IB2004/001774, filed May 31, 2004, the content of which is incorporated herein by reference.

FIELD OF THE INVENTION

The present invention relates to techniques for secure connection in communication networks.

The invention was developed with particular attention to its possible use in Virtual Private Networks (VPN). Naturally, reference to this particular field of possible application is not to be construed as limiting the scope of the invention.

BACKGROUND ART

Techniques for protecting traffic in communication networks are the object of an ever growing interest, also in relation to users' greater mobility.

Nowadays, it is common practice for companies to interconnect their sites by means of public networks, typically packet switched networks like the Internet.

To reduce the risk of compromising the traffic that transits on these networks, numerous protocols have been standardised which are able to safeguard the confidentiality, the authentication and the integrity of the traffic.

Most of these protocols generally uses cryptographic algorithms aimed at reducing the risk that the information comprising the exchanged traffic may be compromised or altered in unauthorised fashion.

In fact, use of cryptography transforms a public network into a virtual private network, enabling to protect the transmitted information, so that only authorised entities can make use of it.

In the literature, numerous protocols are described which are able to offer the characteristics of confidentiality, authentication and traffic integrity.

Among these protocols, of particular importance is the framework IPsec, promoted by the Internet Engineering Task Force in "IP Security Protocol (IPsec)". The framework IPsec comprises numerous protocols able to offer, at the IP layer, security services such as: authentication of the involved parties, confidentiality, integrity, and authentication of the traffic as well as protection against the repetition of packets transmitted in previous communications (so called replay attacks).

Other protocols used for the implementation of a VPN are the protocols, integrated today in any browser or mail client, known as Secure Socket Layer (SSL), de facto standard promoted by the Netscape Corporation in "SSLv3 Protocol Specification", and Transport Layer Security (TLS), an evolution of the SSL protocol promoted by the Internet Engineering Task Force (IETF) RFC2246 in "TLS Version 1.0", January 1999.

There is also the Secure Shell protocol (SSH), also promoted by the Internet Engineering Task Force in "Secure Shell (secsh)". The Secure Shell protocol, together with the two previous ones, is also used to secure, by means of "port forwarding", unprotected protocols based on TCP (Transmission Control Protocol) and on UDP (User Datagram Protocol).

Most frameworks/protocols used in VPNs, such as IPsec, SSL, TLS or SSH, include an authentication step and a step of exchanging the cryptographic keys that are used to protect traffic transiting over the network.

These steps are generally implemented through different strategies, the most common of which provide for the use of access passwords or the use of digital certificates.

Moreover, WO-A-01/69838 proposes a method and a related apparatus for securely exchanging keys between mobile terminals operating on a GSM cellular network or on another communication system. When the method is implemented on a GSM cellular communication system, the information stored on the SIM card is used to generate the keys that are exchanged among the mobile terminals and, subsequently, to protect the data transmitted among the mobile terminals during a communication session. The Applicant has observed that this solution entails an exchange of keys in "Diffie-Helman" mode, characterised by a high computational load.

PURPOSE AND SUMMARY OF THE INVENTION

The Applicant has noted that there is a need to define solutions able to manage in flexible, secure and economical fashion the mechanisms for distributing credentials (for example in the form of an enabling key) to be used to activate a VPN framework/protocol.

In particular, with respect to the prior art the Applicant has noted the specific technical problem linked to the high operating cost of these distribution mechanisms.

Specifically, the present invention uses a secure network (e.g., a GSM/UMTS network) and a secure component of said network (e.g., a SIM module) to generate a mechanism for encrypting the enabling credentials of a cryptographic algorithm that protects communication over a non secure network (e.g. an IP public network) used to access an additional secure network (e.g. a corporate network).

The object of the present invention is to meet this need, in particular overcoming the specific technical problem outlined above.

In accordance with the present invention, said object is achieved by means of a method having the characteristics set out in the appended claims. The present invention also relates to a corresponding system, a network comprising said system, as well as a computer product able to be loaded into the memory of at least one computer and comprising portions of software code to implement the aforesaid method. As used herein, the reference to such a computer product is understood to be equivalent to the reference to a means which can be read by a computer, containing instructions to control a computer system in order to co-ordinate the implementation of the method according to the invention. The reference to "at least one computer" intends to highlight the possibility to implement the present invention in distributed and/or modular fashion.

A currently preferred embodiment of the invention is thus a method for enabling a user (U) to communicate on a virtual private network (VPN) through a public communication network (IP), the possibility of communicating on said virtual private network (VPN) depending on the availability to said user (U) of at least one enabling credential (KS) sent to the user (U) in encrypted form, the method comprising the operations of:

providing said user (U) with a SIM type module bearing an encryption mechanism; and decrypting said at least one enabling credential (KS) at said user (U) exploiting said encryption mechanism borne by said SIM type module, said SIM type module being able to interact with at least one additional communication network to activate said encryption mechanism.

In the currently preferred embodiment, the present invention aims to provide mobile/remote users, connected to an IP public network, with a method for connecting in flexible, secure and economic fashion to any non public network, such as a network operating according to the modes usually indicated as host-to-gateway.

In particular, the solution described herein allows mobile/remote users, provided with a terminal that is interconnected to an IP public network, to enable, if authorised, by means of their own SIM card, a protected channel with a specific gateway positioned at a router for accessing a specific network. In this way, a virtual private network (VPN) is created between the gateway and the users authorised to access the network.

More in detail, the credentials used to enable protected channels are encrypted exploiting the encryption mechanisms present on the SIM cards associated to authorised users and can be decrypted only by said SIMs. The protection of the traffic which transits on the VPN takes place through the encryption algorithm provided by the specific VPN framework/protocol used by the gateway.

In other words, in the embodiment illustrated herein, authorised users, who have a valid SIM card, can access network resources exploiting their SIM alone, without having to use additional credentials or authentication steps and registration actions. The high operating costs linked with such procedures are thus eliminated.

The solution described herein can easily be adapted to numerous VPN protocols. In the remainder of the present description, reference shall be made, merely by way of example, to VPNs based on the IPsec framework or on SSL/TLS protocols. This choice is dictated by the widespread use of said frameworks/protocols, coupled with their significant reliability.

The proposed solution can nonetheless be extended to any other VPN protocol that entails the use of encryption algorithms for traffic protection, and that is associated or can be associated to credentials able to enable said algorithms.

BRIEF DESCRIPTION OF THE DRAWINGS

The invention shall now be described, purely by way of non limiting indication, with reference to the figures of the accompanying drawings, in which:

FIG. 1 an example of a scenario whereto the present invention can be applied;

FIG. 2 shows examples of possible connections between a user terminal and a SIM card;

DETAILED DESCRIPTION OF EMBODIMENTS OF THE INVENTION

Figure 3:
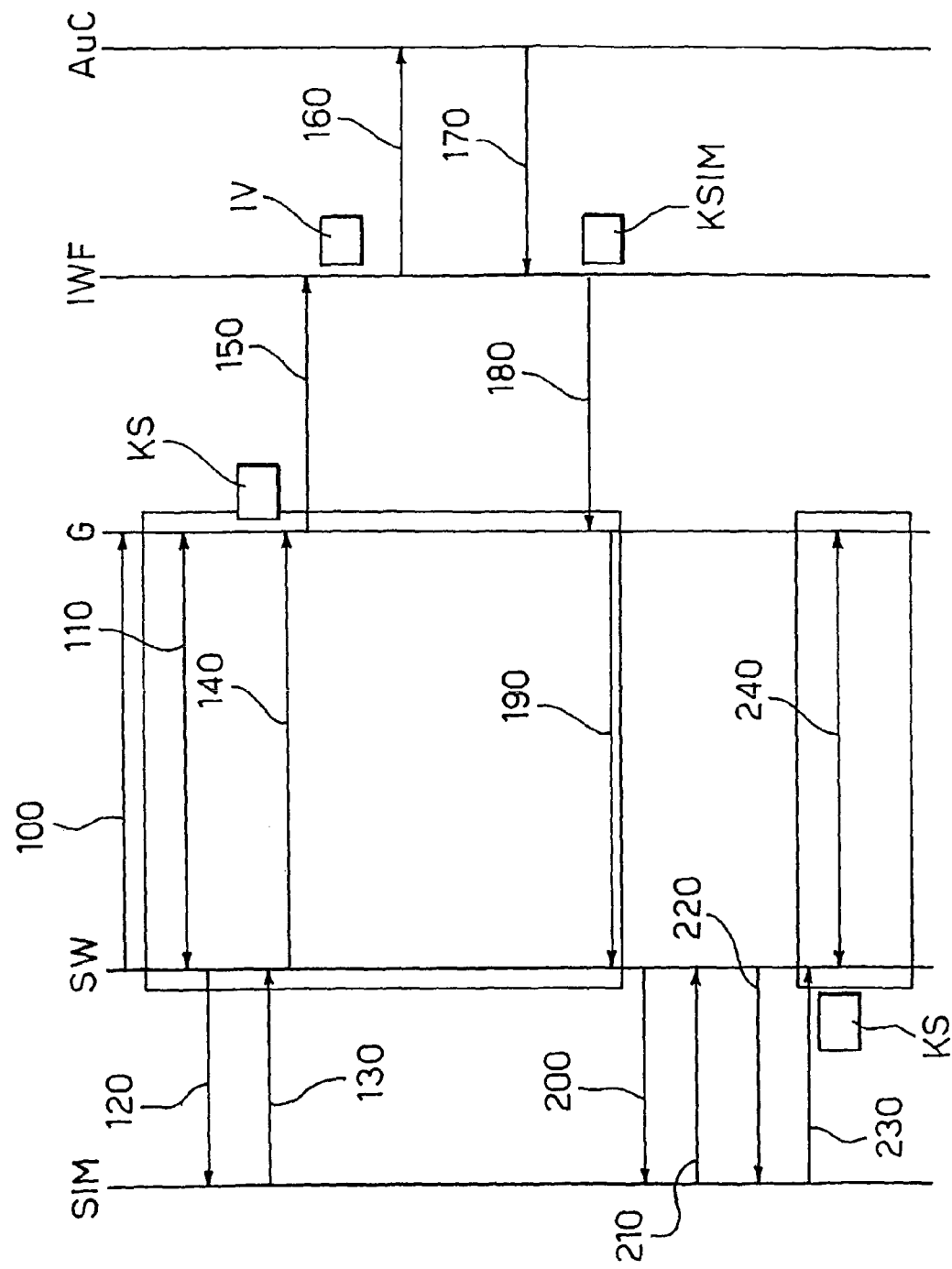
FIG. 3 shows a first embodiment of the connection method according to the invention.

The solution described by way of example herein refers to a scenario in which mobile/remote users, connected to an IP public network and belonging, for example, to a same company, have the need to connect securely to the company's resources. Said connection occurs activating, through the SIM cards associated to the authorised users, a channel protected with an access port, or gateway, positioned at the router for accessing the internal corporate network. In this way, a virtual private network is created on the public IP network between the gateway and the authorised users.

In detail, the credentials used to enable protected channels are encrypted exploiting the encryption mechanisms present on the SIM cards associated to authorised users and can be decrypted only by said SIMs. These credentials, in the embodiment of the invention described hereafter, are distributed in the form of keys. The protection of the traffic which transits on the VPN takes place through the encryption algorithm provided by the specific VPN framework/protocol used by the gateway.

Moreover, hereinafter reference will be made to the world of the cellular technology known as Global System for Mobile Communications (GSM), and in particular to the SIM (Subscriber Identity Module) card.

In fact, in a GSM network the SIM card is the device, generally inserted in the mobile terminal, through which the user is able to authenticate him/herself with the network of a specific GSM operator, in order to have access to voice and data services.

However, the persons versed in the art will readily understand that the term SIM (or SIM-type) as used in the present description and, as the case may be, in the appended claims includes, in addition to the SIM cards currently used in GSM networks, also functionally equivalent modules, such as the module called USIM used in UMTS networks, or other hardware modules able to allow the interaction of a user terminal with one or more specific communication networks, based on user identifier data contained in said modules and made available to the network, to verify the user's identity, through encryption mechanisms running on said modules.

Usually, for "SIM type" module, the implemented authentication mechanism is a classic "challenge-response" mechanism.

In particular, to authenticate the SIM card, and therefore the associated user, in a mobile radio network like GSM or UMTS networks, the network itself generates a non predictable random value called RAND. This parameter is sent to the mobile terminal, which, in turn, sends it to the SIM card. Here the RAND parameter is processed by a cryptographic algorithm chosen by the mobile operator and present aboard the SIM card.

This algorithm, known as A3, encrypts the RAND parameter by means of a specific key present in the SIM card, designated as Ki. The result of this operation, called SRES, serves the authentication response role and therefore is returned to the mobile terminal and thence to the network. The network, in order to authenticate the user, and having available a copy of the Ki key of the SIM card, performs the same process and compares its own result with the one produced by the SIM card.

Access to network resources is allowed once the network verifies the correspondence of the two values. In this case, moreover, the SIM card and the network also process the RAND parameter with a second algorithm, known as A8.

This algorithm encrypts the RAND parameter with the Ki key of the SIM card to produce, at the output, a session key, known as Kc. This key, once it is passed to the mobile terminal, will protect all voice, data and signalling traffic on the network radio link.

The security of this authentication model rests on the secrecy of the Ki key of the SIM card. For this reason, the Ki key is generally protected within the SIM card. Specifically, not only is the Ki key never transmitted over communication channels, but it is not even possible to read it even when one has physical possession of the SIM card (unless, of course, there are cryptographic weaknesses in the A3 and A8 parameters).

The solution described herein substantially exploits two principles: on one hand, the security services offered by SIM cards, e.g. the security mechanisms of cellular technologies, described above and present on the cards; on the other hand, the capability of offering a service to a high number of users without any operating problems in the distribution of access credentials to this service.

Briefly, in the solution described herein, the problem of enabling a protected channel by mobile/remote users is solved using, from the technological viewpoint, the security functions implemented on SIM type cards and typically used in a mobile radio environment, and, from the organisational viewpoint, the procedures for suspending and/or revoking the SIM cards which the mobile operator has already refined and implemented.

Specifically, to enable a user to activate a protected channel, and hence allow him/her secure access to a specific network, e.g. an internal corporate network, it will be sufficient to know the telephone number of the SIM card associated to him/her.

In a possible embodiment of the present invention, the following elements, shown in FIG. 1, are present.

User (U): is the mobile/remote user, holder of the SIM card, who is interconnected to an IP public network through a user terminal TU and needs to activate a secure communication with a gateway G.

User Terminal (TU): it is the terminal, interconnected to an IP public network, through which the user U is able to communicate with the gateway G. Access to the IP network by the user terminal TU can occur through different procedures and access technologies, such as PSTN, ISDN, XDSL, cable, Ethernet, etc. Said access generally takes place through an access provider (Internet Service Provider or ISP). Said terminal can also be connected to the SIM card of the user U.

As shown in FIG. 2, different solutions can be adopted for this purpose, such as a Smart Card reader 10, a cell phone with Bluetooth interface 12, a cell phone with IrDA interface 14, a SIM card reader 16, or a cell phone 18 through a cable. A non limiting list of user terminals TU comprises: PC, notebook, laptop, PDA, smartphone, etc.

Moreover, on the user terminal TU is installed a software module SW able to connect and communicate with the gateway G, on one side, and with the SIM card associated to the user, on the other side. Said software module SW can also not be pre-installed on the user terminal TU, but can be downloaded on-line from a site whereto the user U is able to connect. For this purpose, several technologies can be used. Non limiting examples are Java and ActiveX. Both these technologies allow to insert executable code directly into a web page, by means of appropriate TAGS. A browser that is able to support such mechanisms, e.g. Internet Explorer®, Netscape Navigator® or Opera™, after detecting the presence of the Java applet or of the ActiveX, can locally download the corresponding code and run it. Both mechanisms also allow to set security policies on the download of the executable code. Specifically, the browser can be configured in such a way that only digitally signed Java applets and ActiveX are downloaded, to reduce the risk of downloading malicious software (maleware), written ad hoc to capture users' data or to access the user terminals TU in authorised fashion. Alternatively, other solutions can also be employed, such as downloading an executable through network protocols like FTP, TFTP, HTTP, but also pre-installing the module using a CD, floppy disk, token USB or other means. Note, in any case, that also the solutions based on "portable" memories such as floppy disks, CDs, token USB, can assure a certain degree of portability, although the on-line solution assures a greater coverage of the devices.

Gateway (G): is the gateway that has to authenticate mobile/remote users and to activate protected channels with authorised users, for example using the IPsec framework or the SSL/TLS protocols, in order to protect traffic between said authorised users and, for example, an internal corporate network (indicated as Custom Network CN in FIG. 1). Generally, the gateway G is positioned at the front end of the Custom Network Cn, downstream of its access router. In this way, all access requests by mobile/remote users will be filtered and verified by the gateway G. In case of authorised user, the gateway G will activate the protected channel to allow the transit of all sensitive traffic between the user terminal TU and the gateway G itself. To activate the protected channel, the gateway G can use several VPN protocols such as IPsec, SSL, TLS, SSH.

Inter Working Function (IWF): this is the server, typically under the control of the operator (e.g. a mobile operator) who issued the SIM card to the user U, which allows the gateway G to authenticate the users U who request the activation of a protected channel towards the gateway and to distribute the cryptographic key used by the specific VPN protocol adopted, e.g. IPsec, to encrypt the traffic that transits along the channel. This server also interfaces with the network whereto the SIM card is associated, for instance the GSM network. The Inter Working Function IWF implements access gateway functions between the IP public network and for instance the GSM network and it is also able to access the Authentication Centre or AuC which represent., in known fashion, the network element (GSM) that governs the functions of authentication and generation of users' session keys on the networks (GSM) at the radio link. Therefore, it will be able to request the authentication centre, given an identifier of the SIM card, generally the International Mobile Subscriber Identity, IMSI, specific <RAND, SRES and Kc> triplets.

Preferably, the gateway G and the User Terminal TU are interconnected through an IP public network, whilst the gateway G and the Inter Working Function IWF can be interconnected with different standard and/or proprietary solutions, provided that, for safety reasons, the requirements of authentication of exchanged data, integrity, confidentiality and protection from replay attacks are met.

More specifically, the operation of the solution described herein is based on two main steps:
   registration of the gateway G and of the respective users U
      with the Inter Working Function IWF;
   activation of a virtual private network VPN created
      between authorised users and the gateway G.

In particular, the step of registering the gateway G and the users U has the purpose of allowing the mobile operator to identify which SIM cards, among those issued, can activate protected VPN channels based on the SIM card, in relation to the specific gateway G being registered.

This step requires the operator to provide the following information to the Inter Working Function:
   list of the SIM cards that can access the service through the
      gateway G bring registered;
   interconnection mode (secure) between the Inter Working
      Function IWF and the gateway G.

In fact, the process of activating the VPN between the authorised users U and the gateway G, as shall be described in detail hereafter, also comprises an exchange of information on a protected channel between the gateway G and the Inter Working Function IWF.

This channel is protected, as stated above, in terms of confidentiality of the transmitted data, authentication, integrity and protection against replay attacks. For this purpose, several different routes can be chosen, e.g.: interconnection on link, or dedicated link, connection on public network by means of standard VPN technologies, etc.

Note, in any case, that said communication channels has static characteristics and therefore does not present the same problems of scalability, distribution and management of the keys that are encountered instead with the communication channels that are activated between the authorised users U and the gateway G.

At the end of this step, the gateway G and the Inter Working Function IWF have stored in two respective data bases the list of the SIM cards associated to the users U who are authorised to activate the VPN channels.

The identifier for the authorised SIMs can be selected among many parameters, such as telephone number, Mobile Subscriber ISDN Number (MSISDN), International Mobile Subscriber Identity (IMSI), etc.

A currently preferred choice is to adopt the IMSI as the SIM identifier.

Inside the databases can also be stored additional information, useful to achieve access control. For example, additional access conditions can be specified for each authorised user U. A non limiting list of these additional conditions may include:
- set of addresses that can be reached from that particular IMSI on the Custom Network CN;
- time bands in which secure access is allowed;
- days of the week in which secure access is allowed; and
- enabled protocols for the users.

The step of activating the VPN between the authorised users U and the gateway G can be accomplished in different ways, for example by activating a VPN based on the IPsec framework (hereafter defined as IPsec VPN) or by activating a VPN based on the SSL/TLS protocols (hereafter defined as SSL/TLS VPN).

The goal of the VPN activation step is in fact to activate IPsec or SSL/TLS VPN channels between the authorised users U and the gateway G, with the aid of the Inter Working Function IWF.

With reference to FIG. 3, the process of activating an IPsec VPN comprises the following operations:

i) Each user U interfaces his/her own user terminal TU with his/her own SIM card (as stated, also with reference to FIG. 2, several technical solutions can be used for this purpose, such as: standard PC/SC reader, mobile terminal with Bluetooth interface connected via radio to the computer, mobile terminal with IrDA interface connected via radio to the computer, mobile terminal connected via cable to the Serial, USB, Firewire, or PCMCIA port, etc.);

ii) Each user U activates on his/her own user terminal TU the software module SW, which, in a step 100 requires at its input, e.g. through configuration files, register keys or other means, the information needed to activate the IPsec VPN channel. A non limiting list of said information may include:
- IPsec configuration:
  - IPsec protocols used: Authentication Header-AH, Encapsulation Security Payload—ESP;
  - Cryptographic algorithms used: for example: Advanced Encryption Standard (AES), see National Institute of Standards and Technology (NIST), "Federal Information processing Standards Publication 197 - Advanced Encryption Standard (AES)", November 2001; Triple Data Encryption Standard (3DES), see National Institute of Standards and Technology (NIST), "Federal Information Processing Standards Publications 46-3 - Data Encryption Standard (DES)", October 1999; Secure Hash Standard (SHA-1), see National Institute of Standards and Technology (NIST), "Federal Information Processing Standards Publication 180-2 - Secure Hash Standard (SHS)", August 2002; Message-Digest (MD5), see Internet Engineering Task Force (IETF) RFC1321, "The MD5 Message-Digest Algorithm", April 1992;
  - Use of the Perfect Forward Secrecy (PFS), Re-key policies (based on time or quantity of exchanged data), see policies for managing security Associations (SA) Internet Engineering Task Force (IETF), "IP Security Protocol UPsec".
- Information on the Gateway G:
  - IP address and port of the gateway G relating to the service of activating the protected IPsec VPN channels by means of SIM cards;
  - Digital certificate, e.g. X.509, for the authentication of the gateway G. Other manners of authentication of the gateway G can also be used, for example OpenPGP certificate, One-Time Password, etc. The digital certificate can correspond directly to the gateway G, or to the Certificate Authority (CA) that issued it. The advantage deriving from using the digital certificate is linked to the fact that a single certificate, that of the gateway G, allows all users U to authenticate the gateway G during the activation of the IPsec VPN channels.

iii) In a step 110, the software module SW opens a connection towards the gateway G authenticated by means of digital certificate through the input IP address, on the specified port. This connection provides for authentication of the gateway G by means of the digital certificate, confidentiality, authentication, integrity, and protection against replay attacks.

iv) Once the opening of the connection towards the authenticated gateway G, the gateway G itself requests the software module SW to provide the IMSI of the SIM card connected to the user terminal TU. The software module SW, in a step 120, requests this information from the SIM card, and in a step 140 it sends it to the gateway G. If access to the SIM card is protected by a PIN, the software module SW requests the user U to enter it and passes it to the SIM card before requesting the IMSI.

v) The gateway G verifies the presence of the IMSI provided by the user U, accessing its own data base of IMSIs authorised to activate an IPsec VPN channel. The SIM card could be authorised to activate the IPsec VPN channel only as a function of specific additional policies, such as hour bands, days of the week, origin IP addresses, destination IP addresses, etc.

If the outcome is negative, the gateway G shuts down the connection and updates a log file with information about the request. A non limiting list of this information may include:
- Time co-ordinates of the request (hour, minutes, seconds, day, month, year);
- IP address and port relating to the requesting user U;
- IMSI (or other identifier) of the SIM card pertaining to the user U;
- Code for the refusal to activate the IPsec VPN channel (for example, unauthorised IMSI, time band not allowed, source IP address not allowed, etc.).

If the outcome is positive, the gateway G continues executing the activation step and updates the log file for the user U requesting the activation of the IPsec VPN channel.

vi) The gateway G then generates an enabling key KS, for example in random fashion, which together with the received IMSI is forwarded, in a step 150, to the Inter Working Function IWF.

Briefly, to the Inter Working Function IWF is sent a message M comprising the pair of information items: (IMSI, KS). It is also possible to cause the gateway G not to generate the enabling key KS, but to have the Inter Working Function IWF to generate said key.

vii) The Inter Working Function IWF in turn verifies the presence of the IMSI provided by the gateway G accessing its own data base of IMSIs authorised to activate an IPsec VPN channel in relation to the specific gateway G. In case of negative outcome of the check, the Inter Working Function IWF notifies the gateway G that the operation failed by means of an appropriate error code, then updates a log file. Said log file log can contain different information. A non limiting example of said information may comprise:

Time co-ordinates of the request (hour, minutes, seconds, day, month, year);
IMSI of the SIM pertaining to the user U;
Identifier of the specific gateway G making the request (e.g. IP address and port).

If the outcome is positive, the Inter Working Function IWF continues to execute the activation phase and, in a step 160, it contacts the authentication centre AuC from which it requests, for the received IMSI, two GSM authentication triplets. The authentication centre AuC sends two triplets <RAND1, SRES1, Kc1> and <RAND2, SRES2, Kc2> to the Inter Working Function IWF the in a step 170. The Inter Working Function IWF then calculates an encryption key KSIM in the following manner:

$$KSIM=h(Kc_1, Kc_2)$$

Said value represents the application of a hash function h to the concatenation of the two GSM session keys Kc1 and Kc2 associated to the secret key Ki of the SIM. In the specific case, the standardised hash function SHA-1 was used. It is nonetheless possible to use any other secure hash function. A non limiting list can include, for example:

MD5, see Internet Engineering Task Force (IETF) RFC1321, "The MD5Message-Digest Algorithm", April 1992;
Tiger, R. Anderson, E. Biham, "Tiger: A Fast New Cryptographic Hash Function";
RIPEMD-160, H. Dobbertin, A. Bosselaers, B. Preneel, "RIPEMD-160, a strengthened version of RIPEMD", Fast Software Encryption, LNCS 1039, D. Gollmann, Ed., Springer-Verlag, 1996, pp. 71-82;
UHASH, T. Krovetz, J. Black, S. Halevi, A. Hevia, H. Krawczyk, P. Rogaway, "UMAC: Message Authentication Code using Universal Hashing", Advances in Cryptology—CRYPTO '99.

More in general, the KSIM encryption key can be calculated on the basis of n authentication triplets <$RAND_n$, $SRES_n$, $Kc_n$> such as:

$$KSIM=f(Kc_1, Kc_2, \ldots, Kc_n; SRES_1, SRES_2, \ldots, SRES_n)$$

For security reasons it is convenient for the function f, as the has functions, not to be reversible, so that it will not be possible to obtain the GSM session keys $Kc_i$, and possibly the $SRES_i$ that generated them from the knowledge of the KSIM encryption key.

At this point, the Inter Working Function IWF can generate a random Initialisation Vector (IV), functional to encryption operations, then proceeds to calculate the following message $M_1$ which, in a step 180, is returned to the gateway G:

$M_1$: RAND1, RAND2, IV, cert_KS, $E_{KSIM,IV}$(KS, cert_KS, h(KS, cert_KS))

where $E_{KSIM,IV}$(M) is the encryption protecting the message $M_1$ by means of an algorithm E, the encryption key KSIM and the initialisation vector IV.

In the specific case, the AES encryption algorithm was used in CBC (Cipher Block Chaining) mode with KSIM key and initialisation vector IV at 128 bit. It is nonetheless possible to use any other encryption algorithm, preferably of the symmetrical type. A non limiting list of these algorithm may include, for example:

Twofish, B. Schneier, J. Kelsey, D. Whiting, D. Wagner, C. Hall, N. Ferguson, "Twofish: A 128-Bit Block Cipher", AES submission, June 1998;
RC6, R. Rivest, M. Robshaw, R. Sidney, Y. L. Yin, "The RC6 Block Cipher, algorithm specification", August 1998; and
Serpent, Anderson, E. Biham, L. Knudsen, "Serpent", AES submission, 1998.

Moreover, in the $M_1$ message returned to the gateway G in step 180, the term h(KS, cert_KS) represents the application of the hash function h to the enabling key KS concatenated to its digital certificate. Said term present inside the encrypted message will allow, during decryption operations, to verify the integrity of the digital certificate and of the enabling key KS. In the specific case, the hash function SHA-1 was used, although any other hash function can be used.

In the message returned to the gateway G in the step 180, the term cert_KS is a sort of certificate of the enabling key KS (key certificate). It can encode any information linked to the modes for employing the enabling key KS. A non limiting list of these modes may include for example:

time validity of the enabling key KS (example from an initial instant $t_1$ to a final instant $t_2$);
type of services usable with the enabling key KS. For example, in the specific case, IPsec VPN services or secure SIM services (mail, logon, etc.);
entity that requested the enabling key KS. For example, in the specific case, the identifier of the gateway G.

viii) Once the message $M_1$ is received from the Inter Working Function, the gateway G, in a step 190, sends the following $M_2$ message:

$M_2$: RAND1, RAND2, IV, $E_{KSIM,IV}$(KS, cert_KS, h(KS, cert_KS))

ix) In the steps 200 and 220, the software module SW, once the message $M_2$ is received, sends the values of RAND1 and RAND2 to the SIM card and requests the SIM card to compute the following session keys GSM:Kc1=A8(RAND1), Kc2=A8(RAND1) associated to the key Ki of the SIM card.

In turn, the SIM card, through the steps 210 and 230, returns the GSM session keys Kc1 and Kc2 to the software module SW.

Once the GSM session keys Kc1 and Kc2 are known, the software module SW calculates the encryption key:

$$KSIM=h(Kc1, Kc2)$$

Then, once the KSIM encryption key is reconstructed and the initialisation vector IV is extracted from the message $M_2$, the software module SW decrypts the rest of the message $M_2$ obtaining the following parameters in the clear: the enabling key KS, and the terms cert_KS and h(KS, cert_KS). The software module SW then verifies the correctness of the enabling key KS recalculating the hash of the key KS concatenated to the corresponding digital certificate and comparing it to the decrypted hash value, contained in the received message $M_2$.

If there is no correspondence between the two values, the software module SW sends to the gateway G a message containing an error code relating to the event that occurred, and informs the user U, through the Graphical User Interface (GUI), on the impossibility of activating an IPsec VPN channel.

x) If the outcome of the comparison is positive, the software module SW verifies the certificate of the enabling key KS. Specifically the software module SW verifies that:
the period of validity of the enabling key KS has not expired;
use of the enabling key KS in relation to the setting of an IPsec VPN channel is allowed;
the gateway G that requested the enabling key KS is in fact the registered one.

If even a single check fails, then the software module SW sends to the gateway G a message containing an error code pertaining to the event that occurred and informs the user U, by means of a Graphical User Interface, of the impossibility to activate the IPsec VPN channel.

xi) If the checks set out in x) yield a positive outcome, then the software module SW creates, in a step 240, a so-called IPsec policy with pre-shared key authentication, on the basis of the configuration read as an input. The value of the pre-shared key IPsec is in fact given by the enabling key KS. The outcome of the operation is then returned to the gateway G.

xii) The gateway G performs a similar operation, creating an IPsec policy with pre-shared key authentication for the IP address of the user terminal connected with enabling key equal to KS.

xiii) At this point the user U and the gateway G can exchange information in protected fashion. Depending on the IPsec configuration, it will be possible to protect at the IP layer all the exchanged information in terms of confidentiality, authentication, integrity and protection against replay.

Note that, advantageously, the gateway G does not need to know "a priori" the IP address of the users U who request the activation of an IPsec VPN channel. Moreover, each request to activate the IPsec VPN channel may take place with a different IPsec pre-shared key, depending on the required level of security. Alternatively, depending on the certificate for the enabling keys KS, the same key may be used for multiple requests, enhancing the performance of the VPN IPsec activation phase.

Moreover, the method described above can be modified so that not even the mobile operator is able to know the real enabling key KS. This can be achieved by ensuring that both the software module SW on the user terminal TU and the gateway G have available a shared secret to be mixed to the enabling key KS obtained by means of the Inter Working Function IWF. Note that this solution offers an even higher level of security with respect to the simple use of said additional secret within the IPsec engine as pre-shared key for channel activation. In this latter case, said secret, not undergoing any modifications between one activation request and the subsequent one, would be exposed to numerous attacks. This would entail having to modify the enabling key, causing the system to fall back into the problems with the management of traditional pre-shared key VPNs (management, distribution, updating, revocation, etc.). Instead, mixing said shared secret with an enabling key KS that is intrinsically linked to the user U and potentially different for each request, allows to minimise the risks of attack without entailing any management loads.

In wholly dual fashion with respect to the above description, the activation of an SSL/TLS VPN consists of activating the SSL/TLS VPN channels between the authorised users U and the gateway G, with the aid of the Inter Working Function IWF.

Figure 4:
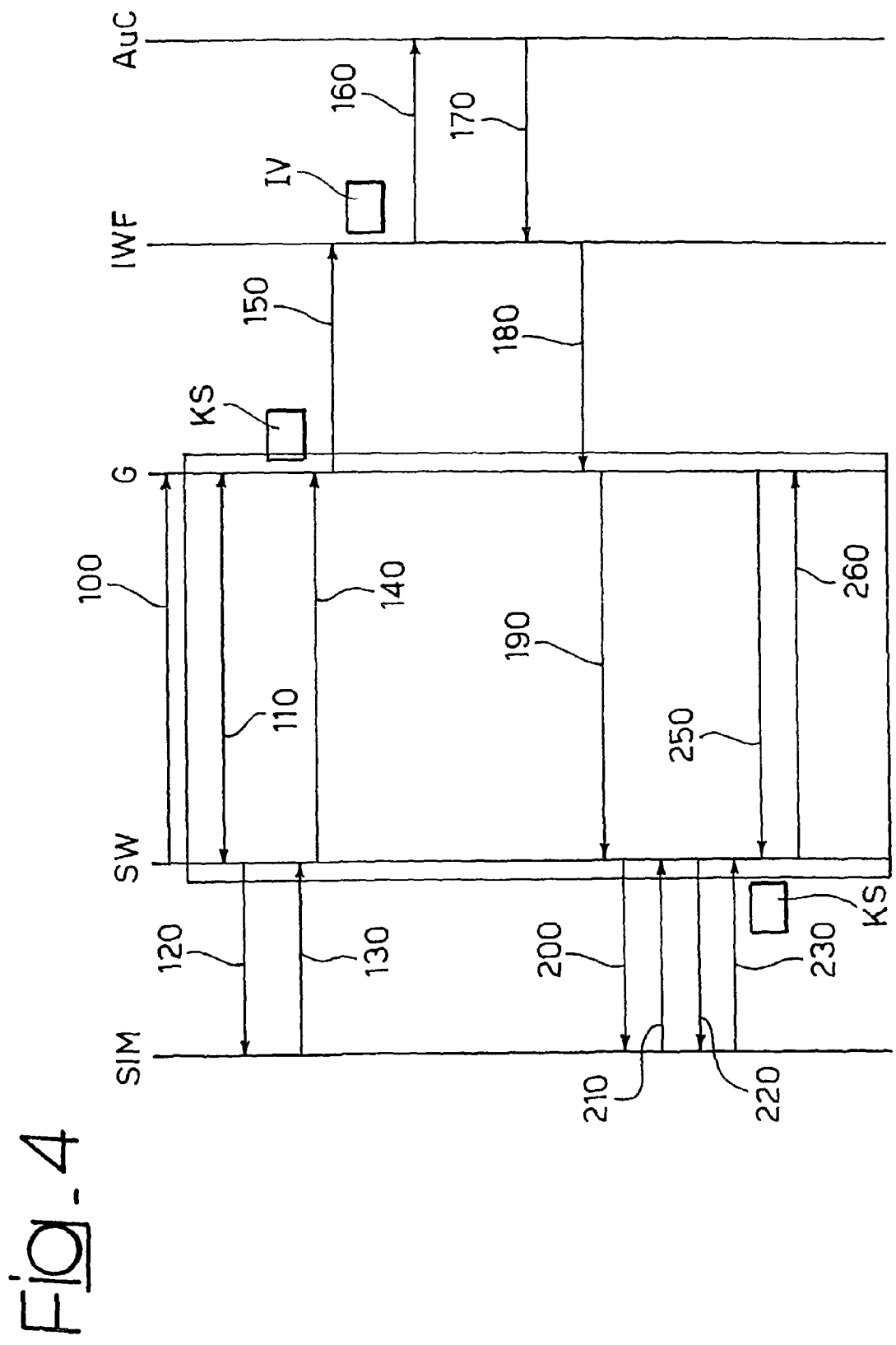
FIG. 4 shows a second embodiment of the connection method according to the invention.

With reference to FIG. 4, the phase of activating an SSL/TLS VPN comprises the following steps:

i) execution of the steps i) through x) described above with respect to the activation of an IPsec VPN. The steps have thus been indicated in FIG. 4 with the same references already adopted in FIG. 3.

ii) At this point, if all the checks provided by the steps i) and x) described above were successful, the gateway G and the user U will already have activated a VPN SSL/TLS channel, the user U will already have authenticated the gateway G by means of a digital certificate, and lastly the user U and the gateway G will have available a shared key corresponding to the enabling key KS. The gateway G still needs to authenticate the user U in order to grant or withhold protected access to the Custom Network CN and hence use of the existing SSL/TLS VPN channel. To do so, the gateway G can use different strategies. In a non limiting example, a challenge-response mechanism is used. The gateway G generates and sends to the software module SW, in a step 250, a "nonce" comprising a random part (random_value) and a timestamping (timestamping), i.e. the pair<random_value, timestamping>.

iii) The software module SW receives the nonce and processes it, in a step 260, with a MAC (Message Authentication Code) function, on the basis of the enabling key KS. Briefly, the following function is obtained:

$$MAC_{KS}(\text{random\_value}, \text{timestamping})$$

where $MAC_K(M)$ represents the MAC function of the message M, computed on the basis of the enabling key KS. Several strategies can be followed to choose the MAC function. A non limiting example includes:
HMAC-SHA-1, see Internet Engineering Task Force (IETF), "HMAC: Keyed-Hashing for Message Authentication", February 1997;
UMAC, T. Krovetz, J. Black, S. Halevi, A. Hevia, H. Krawczyk, P. Rogaway, "UMAC: Message Authentication Code using Universal Hashing", Advances in Cryptology—CRYPTO '99.
HMAC-MD5;
AES-XCBC-MAC-96, S. Frankel, H. Herbert, "The AES-XCBC-MAC-96 Algorithm and Its Use with IPsec", Internet draft (work in progress), draft-ietf-ipsec-ciph-aes-xcbc-mac-02.txt, June 2002.

A currently preferred implementation choice provides for using the HMAC-SHA-1 solution. The MAC function is lastly returned to the gateway G for verification.

iv) The gateway G, having received the MAC function and having all data available, including the enabling key KS, repeats the calculation of the MAC function and compares the results.

In case of match, the SSL/TLS VPN channel is kept active, otherwise the SSL/TLS VPN channel is closed. In both cases, the log file is updated.

For the authentication of the user U by the gateway G, any other authentication mechanism based on the knowledge of a shared secret can be used. The use of a MAC function is only an example of implementation.

The main advantages offered by the proposed method consist of the higher level of security offered by the invention with respect to solutions based on passwords, without running into the high operating and implementing costs of a Virtual Private Network based on certificates and Public Key Infrastructure (PKI).

The SIM card, being a hardware device, is a tamper proof security device. Since the key Ki normally cannot be extracted from the SIM card, this is a high security level because the correct operation of the VPN requires physical possession of the card and knowledge of the Personal Identification Number (PIN). Typically, after three attempts at entering the PIN, the card is locked, pre-empting attempted attacks based on theft and carried out before the user realises it and notifies his/her mobile operator.

In this regard, it should be noted that existing security procedures for SIM cards are consolidated and well defined, and have been refined over the years by mobile operators. Therefore, such techniques, originally devised within the GSM context, can also be used to manage authentication credentials on IP public networks. Said procedures, are independent from the network technology employed by the user, for example GSM or IP.

It will be appreciated, moreover, that the solution described herein requires no modification or personalisation of the SIM card used by the service through SIM Application Toolkit (SAT) environments or the like. This potentially allows any GSM user to activate a VPN channel securely and without any additional registrations, password communications or other procedures. Consequently, without altering the principle of the invention, the construction details and the embodiments may be varied, even to a significant extent, relative to what is described and illustrated herein, without thereby departing from the scope of the invention as defined in the claims that follow.

The invention claimed is:

1. A method for enabling a user to communicate on a virtual private network through a public communication network, a possibility of communicating on said virtual private network depending on an availability to said user of at least one enabling credential sent to the user in encrypted form, comprising the steps of:
   providing said user with a SIM type module bearing an encryption mechanism;
   providing the user with a user terminal communicating with the SIM type module;
   generating the at least one enabling credential;
   encrypting the at least one enabling credential using information associated with the encryption mechanism borne by the SIM type module;
   transmitting to the user terminal an encrypted message containing the encrypted at least one enabling credential, wherein the encrypted at least one enabling credential is decrypted at the user terminal based on information generated by the SIM type module using the same encryption mechanism,
   providing encrypted communication modes between said virtual private network and the user who communicates thereon;
   providing at least one gateway associated with said virtual private network to activate said encrypted communication modes;
   registering said at least one gateway and the user with an inter working function; and
   activating said virtual private network between said user and said at least one gateway;
   wherein said step of registering said at least one gateway and the user with said inter working function entails the step of identifying which ones, in a set of SIM type modules issued, are SIM type modules enabled to communicate on said virtual private network in relation to a specific gateway.

2. The method as claimed in claim 1, comprising the step of providing said user with the SIM type module comprising a SIM card able to interact with at least one mobile telephony network.

3. The method as claimed in claim 1, comprising the step of providing said user with the user terminal capable of connecting to said public communication network and to said SIM type module.

4. The method as claimed in claim 1, comprising the step of providing said user with the user terminal selected from the group of: PC, notebook, laptop, PDA, and smartphone.

5. The method as claimed in claim 3, comprising the step of providing said user with the user terminal capable of connecting to said SIM type module through at least a communication channel selected from the group of: a Smart Card reader, a Bluetooth channel, an IrDA channel, a SIM card reader, a cell phone, and a cable.

6. The method as claimed in claim 1, comprising the step of providing said encrypted communication modes according to protocols selected from SSL, TLS, SSH and IPsec.

7. The method as claimed in claim 1, comprising the step of providing the inter working function co-operating with at least one additional communication network, said at least one additional communication network being provided with an authentication center, said SIM type module being able to interact with said at least one additional communication network to activate said encryption mechanism.

8. The method as claimed in claim 7,
   wherein said user terminal for mobile communication being capable of communicating with said authentication center through said inter working function,
   said method further comprising the step of:
      requesting from said authentication center, given a request by said user to communicate on said virtual private network, at least one respective set of authentication data, said authentication data being used to activate said encryption mechanism borne by said SIM type module.

9. The method as claimed in claim 8, wherein said requesting step comprises transmission of an identifier of said SIM type module to said authentication center.

10. The method as claimed in claim 9, wherein said identifier is an international mobile subscriber identity.

11. The method as claimed in claim 8, wherein said authentication data comprise at least one triplet.

12. The method as claimed in claim 1, wherein said step of registering said at least one gateway and the user with said inter working function entails an operation of providing said inter working function with information selected in the group of:
   list of SIM type modules capable of accessing services of said virtual private network through the at least one gateway; and
   interconnecting modes between said inter working function and said at least one gateway.

13. The method as claimed in claim 12, wherein said interconnecting modes between said inter working function and said at least one gateway are selected from the group of interconnection on a dedicated link and connection on the public communication network by means of virtual private newtork technologies.

14. The method as claimed in claim 1, comprising the steps of receiving from said user who intends to communicate over said virtual private network, an identifier of said SIM type module with associated information entities selected from the group of:

a set of addresses reachable by said identifier on said virtual private network, time bands in which said user is allowed to access said virtual private network;

days of a week in which said user is allowed to access said virtual private network; and enabled protocols for said user.

15. A system for enabling a user to communicate on a virtual private network through a public communication network, a possibility of communicating on said virtual private network depending on an availability to said user of at least one enabling credential sent to the user in encrypted form, comprising:

a network connection utilizing encrypted communication modes between said virtual private network and the user who communicates thereon;

at least one SIM type module provided to said user and bearing an encryption mechanism and configured to communicate with at least an additional communication network;

a user terminal provided to said user and configured to communicate with said at least one SIM type module;

a gateway device associated with said virtual private network and configured to activate said encrypted communication modes and generate the at least one enabling credential;

a server configured to receive the at least one enabling credential from the gateway device, and encrypt the at least one enabling credential using information associated with the encryption mechanism borne by the SIM type module;

an inter working function with which said gateway device and the user are registered to entail identifying which ones, in a set of SIM type modules issued, are SIM type modules enabled to communicate on said virtual private network in relation to the gateway device;

wherein the gateway device is further configured to receive the encrypted at least one enabling credential from the server and transmit to the user terminal an encrypted message containing the encrypted at least one enabling credential, wherein the gateway device is further configured to activate said virtual private network between said user and said gateway device, and wherein the user terminal decrypts the encrypted at least one enabling credential based on information generated by the SIM type module using the same encryption mechanism.

16. The system as claimed in claim 15, wherein said at least one additional communication network comprises an authentication center to provide authentication data capable of activating said encryption mechanism.

17. A public communication network configured to enable a user to communicate on a virtual private network through said public communication network, a possibility of communicating on said virtual private network depending on an availability to said user of at least one enabling credential sent to the user in encrypted form, the public communication network having a system according to claim 15.

18. A non-transitory computer readable storage medium encoded with a computer product capable of being loaded into a memory of an electronic computer and comprising portions of software code capable of implementing the method as claimed in claim 1.

* * * * *

UNITED STATES PATENT AND TRADEMARK OFFICE
CERTIFICATE OF CORRECTION

| | | |
|---|---|---|
| PATENT NO. | : 8,296,825 B2 | Page 1 of 1 |
| APPLICATION NO. | : 11/597832 | |
| DATED | : October 23, 2012 | |
| INVENTOR(S) | : Manuel Leone | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this
Eighth Day of July, 2014

Michelle K. Lee
*Deputy Director of the United States Patent and Trademark Office*